US009182796B2

(12) United States Patent  
Hara

(10) Patent No.: US 9,182,796 B2
(45) Date of Patent: Nov. 10, 2015

(54) IMAGE PROCESSING INCLUDING HIBERNATION

(71) Applicant: CANON KABUSHIKI KAISHA, Tokyo (JP)

(72) Inventor: Kenji Hara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 353 days.

(21) Appl. No.: 13/685,530

(22) Filed: Nov. 26, 2012

(65) Prior Publication Data

US 2013/0151880 A1 Jun. 13, 2013

(30) Foreign Application Priority Data

Dec. 9, 2011 (JP) ................... 2011-270616

(51) Int. Cl.
*G06F 1/32* (2006.01)
*G06F 1/26* (2006.01)
*G03G 15/00* (2006.01)

(52) U.S. Cl.
CPC .............. *G06F 1/26* (2013.01); *G03G 15/5004* (2013.01); *G06F 1/3228* (2013.01)

(58) Field of Classification Search
CPC .... G06F 1/3203; G06F 1/3228; G06F 9/4418
USPC ........................................................ 713/323
See application file for complete search history.

(56) References Cited

U.S. PATENT DOCUMENTS

| 4,953,405 | A | | 9/1990 | Hara et al. |
| 5,018,148 | A | * | 5/1991 | Patel et al. ................. 714/22 |
| 5,301,552 | A | | 4/1994 | Nagura et al. |
| 5,381,693 | A | | 1/1995 | Kobayashi et al. |
| 5,435,005 | A | * | 7/1995 | Saito ........................ 714/42 |
| 5,822,600 | A | * | 10/1998 | Hallowell et al. ........... 713/340 |
| 6,049,884 | A | | 4/2000 | Tsuji |
| 6,553,476 | B1 | * | 4/2003 | Ayaki et al. ................. 711/204 |
| 7,555,056 | B2 | | 6/2009 | Hara et al. |
| 7,721,126 | B2 | | 5/2010 | Mashimo et al. |
| 7,873,848 | B2 | | 1/2011 | Nakahara et al. |
| 2008/0045159 | A1 | | 2/2008 | Mashimo et al. |
| 2009/0157960 | A1 | * | 6/2009 | Koga ........................ 711/115 |
| 2010/0121952 | A1 | | 5/2010 | Hara |
| 2011/0087901 | A1 | * | 4/2011 | Lo et al. .................... 713/300 |
| 2011/0188421 | A1 | | 8/2011 | Nakahara et al. |

FOREIGN PATENT DOCUMENTS

| JP | 11-003151 A | 1/1999 |
| JP | 2002-073220 A | 3/2002 |

* cited by examiner

*Primary Examiner* — Jaweed A Abbaszadeh
*Assistant Examiner* — Gary Collins
(74) *Attorney, Agent, or Firm* — Fitzpatrick, Cella, Harper & Scinto

(57) ABSTRACT

When the first time has elapsed after the operator operates a power switch to stop power supply, an image processing apparatus forcibly stops power supply. When stopping power supply, the image processing apparatus executes hibernation processing to retract, in a secondary storage device, the stored content of a main memory used as a work area by a CPU. When the hibernation processing will be completed within a target time necessary to complete the hibernation processing and end processing of the image processing apparatus before the first time elapses, the image processing apparatus executes the end processing of the image processing apparatus and stops power supply after completing the hibernation processing; otherwise, the image processing apparatus interrupts the hibernation processing, executes the end processing of the image processing apparatus, and stops power supply.

8 Claims, 11 Drawing Sheets

IMAGE PROCESSING INCLUDING HIBERNATION

BACKGROUND OF THE INVENTION

1. Field of the Invention

The present invention relates to an image processing apparatus, control method therefor, and storage medium.

2. Description of the Related Art

Along with the development of high performance technology, current image processing apparatuses tend to take a longer startup time until they become operable after the user turns on the power switch. To solve this, there is a method of shortening the startup time by a suspend method which energizes a main memory when the user performs a power-off operation. However, when the main memory is a general DRAM or the like, the suspend method needs to continue energization, increasing standby power. A technique for reducing standby power to zero is a hibernation method. The hibernation method is a technique employed to further improve power saving performance though it takes a longer return time than that in the suspend method. For example, Japanese Patent Laid-Open No. 2002-73220 discloses a technique of assigning a physical power switch (toggle switch) having an OFF/ON state as the hibernation function. Japanese Patent Laid-Open No. 11-3151 discloses a technique of performing a hibernation operation when the battery is running out. At this time, even if the battery runs out, this technique avoids power-off during the hibernation shift.

However, the conventional techniques have the following problems. For example, in Japanese Patent Laid-Open No. 2002-73220, the power switch of the image processing apparatus is a (toggle) switch having a physical OFF/ON state, so the OFF/ON state of the switch and the power OFF/ON state of the main body need to coincide with each other. That is, a state in which the power supply of the main body remains ON though the switch is OFF should not occur. To prevent this, when the power switch is turned off, a protection timer needs to be set in the power supply device separately from software control to guarantee that the power supply will be turned off without fail after a predetermined time. However, when the power switch is assigned as the hibernation function, if hibernation shift processing is not completed in time, the power supply is forcibly turned off based on the protection timer during the hibernation shift.

SUMMARY OF THE INVENTION

The present invention enables realization of a mechanism of safely executing hibernation shift processing even in an arrangement which turns off the power supply without fail a predetermined time after turning off the power switch, and preferably shortening the time till the stop of power supply.

One aspect of the present invention provides an image processing apparatus which forcibly stops power supply when a first time has elapsed after an operator operates a power switch to stop power supply, comprising: a processing unit that executes hibernation processing to retract, in a secondary storage device, a stored content of a main memory used as a work area by a CPU of the image processing apparatus when stopping power supply to the image processing apparatus; a determination unit that determines whether or not the hibernation processing by the processing unit will be completed within a target time necessary to complete the hibernation processing and end processing of the image processing apparatus before the first time elapses; and a power control unit that, when the hibernation processing is determined to be completed within the target time, executes the end processing of the image processing apparatus and stops power supply after the processing unit completes the hibernation processing, and when the hibernation processing is determined not to be completed within the target time, interrupts the hibernation processing by the processing unit, executes the end processing of the image processing apparatus, and stops power supply.

Another aspect of the present invention provides a method for controlling an image processing apparatus which forcibly stops power supply when a first time has elapsed after an operator operates a power switch to stop power supply, comprising: causing a processing unit to execute hibernation processing to retract, in a secondary storage device, a stored content of a main memory used as a work area by a CPU of the image processing apparatus when stopping power supply to the image processing apparatus; causing a determination unit to determine whether or not the hibernation processing in the causing the processing unit to execute the hibernation processing will be completed within a target time necessary to complete the hibernation processing and end processing of the image processing apparatus before the first time elapses; and causing a power control unit to, when the hibernation processing is determined to be completed within the target time, execute the end processing of the image processing apparatus and stop power supply after completing the hibernation processing in the causing the processing unit to execute the hibernation processing, and when the hibernation processing is determined not to be completed within the target time, interrupt the hibernation processing in the causing the processing unit to execute the hibernation processing, execute the end processing of the image processing apparatus, and stop power supply.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Processing Apparatus>

Figure 1:
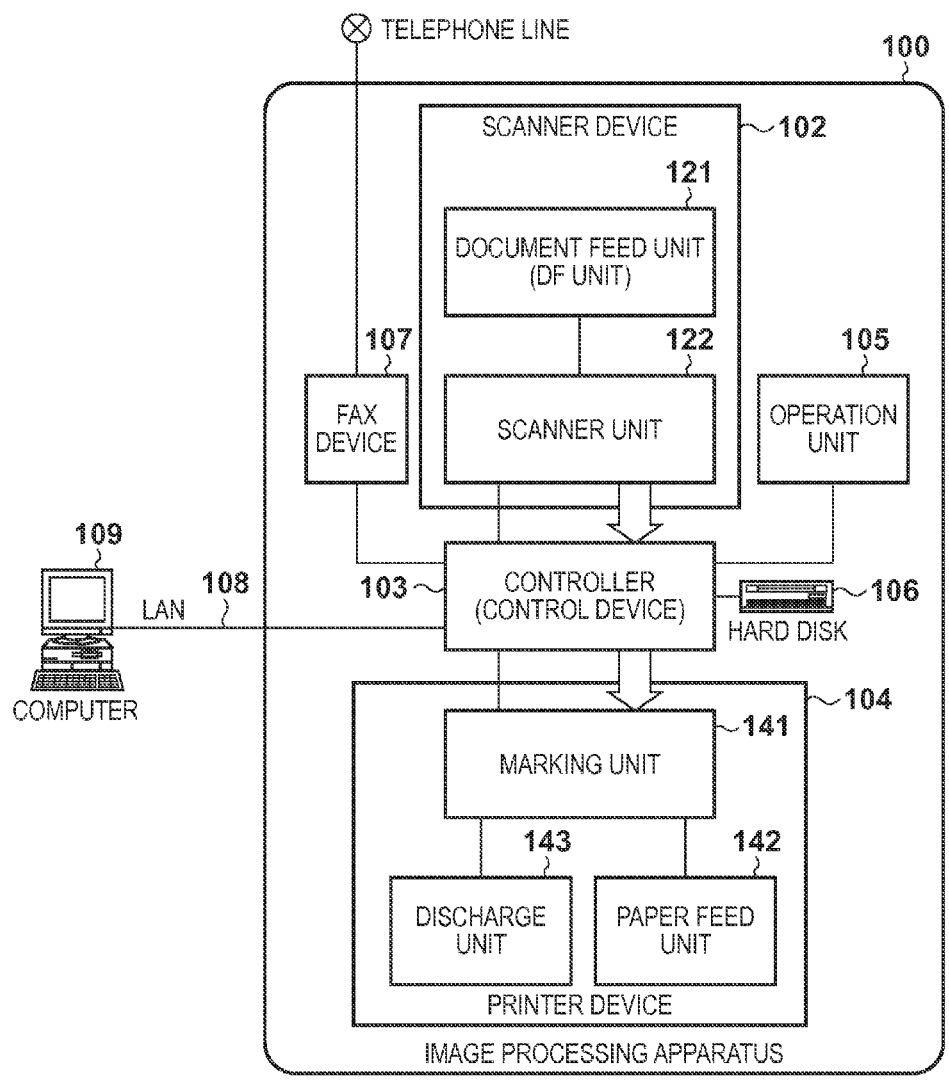
FIG. 1 is a view exemplifying the arrangement of an image processing system according to an embodiment.

The arrangement of an image processing system in an embodiment will be described with reference to FIG. 1. As shown in FIG. 1, the image processing system includes an image processing apparatus 100, and a computer 109 connected to the image processing apparatus 100 via a LAN 108. Note that this system arrangement is merely an example, and is not intended to limit the present invention. For example, the image processing system may include another image processing apparatus and another computer.

The image processing apparatus 100 includes a scanner device 102, controller 103, printer device 104, operation unit 105, hard disk 106, and FAX device 107. The scanner device 102 optically reads an image from an original and converts it into a digital image. The printer device 104 outputs a digital image onto a paper medium. The operation unit 105 is an interface for operating the image processing apparatus 100 by the user. The hard disk 106 stores digital images, control programs, and the like. The FAX device 107 transmits a digital image to a telephone line or the like, and receives a digital image from the telephone line or the like. The controller 103 is connected to the above-described modules, and executes a job on the image processing apparatus 100 by issuing instructions to the respective modules.

The image processing apparatus 100 can, for example, receive/output a digital image from/to the computer 109 via the LAN 108, and issue a job and an instruction to a device. The scanner device 102 includes a document feed unit 121 capable of automatically changing a bundle of originals in sequence, and a scanner unit 122 capable of optically scanning an original and converting it into a digital image. The scanner device 102 transmits converted image data to the controller 103. The printer device 104 includes a paper feed unit 142 capable of sequentially feeding sheets one by one from a sheet bundle, a marking unit 141 for printing image data on a fed sheet, and a discharge unit 143 for discharging a printed sheet.

The image processing apparatus 100 can execute various jobs. Examples are as follows:

Copy Function

An image read from the scanner device 102 is recorded on the hard disk 106, and at the same time, printed using the printer device 104.

Image Transmission Function

An image read from the scanner device 102 is transmitted to the computer 109 via the LAN 108.

Image Save Function

An image read from the scanner device 102 is recorded on the hard disk 106, and if necessary, transmitted and printed.

Image Print Function

For example, a page description language transmitted from the computer 109 is analyzed and printed by the printer device 104.

<Arrangement of Controller>

Figure 2:
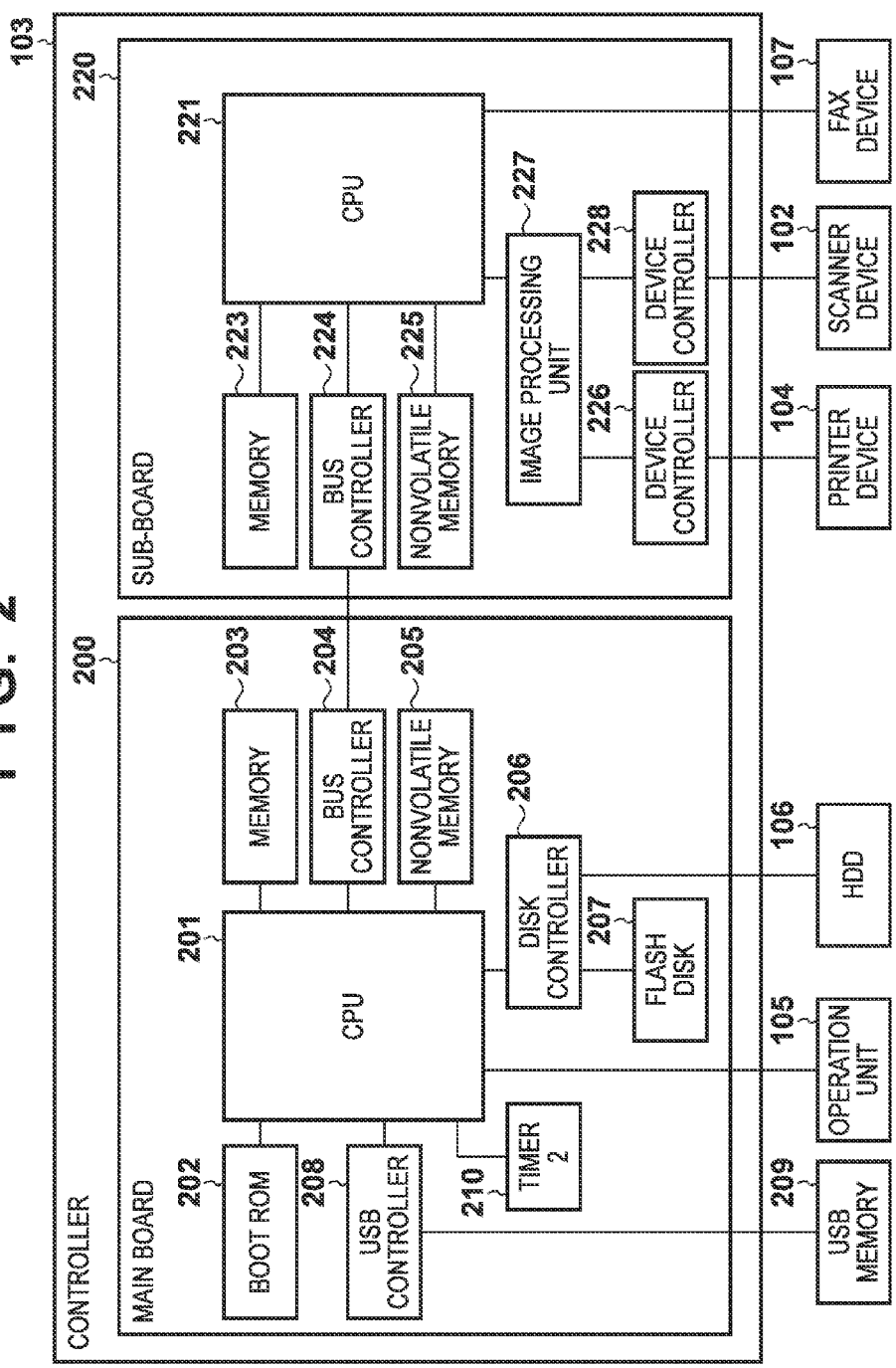
FIG. 2 is a block diagram exemplifying the arrangement of a controller according to the embodiment.

The arrangement of the controller 103 will be exemplified with reference to FIG. 2. The controller 103 includes a main board 200 and sub-board 220. The main board 200 is a so-called general-purpose CPU system, and includes a CPU 201, boot ROM 202, memory 203, bus controller 204, nonvolatile memory 205, disk controller 206, flash disk 207, USB controller 208, and timer 210. The CPU 201 performs centralized control of the overall board. The boot ROM 202 stores a boot program serving as a program used in initial startup. The memory 203 is a main memory used as a work area by the CPU 201. The bus controller 204 has a bridge function with an external bus. The nonvolatile memory 205 is a memory which does not lose the stored contents even upon power-off. The disk controller 206 controls a storage device. The flash disk (for example, SSD) 207 is a relatively-small-capacity storage device formed from a semiconductor device. The USB controller 208 controls a USB device (USB memory 209 in this case). The timer 210 is a system protection timer functioning as a timer means. The USB memory 209, operation unit 105, hard disk 106, and the like are connected to the main board 200 from the outside.

The sub-board 220 is formed from a relatively-small general-purpose CPU system and image processing hardware. The sub-board 220 includes a CPU 221, a memory 223, a bus controller 224, a nonvolatile memory 225, an image processing unit 227, and device controllers 226 and 228. The CPU 221 performs centralized control of the overall board. The memory 223 is used as a work memory by the CPU 221. The bus controller 224 has a bridge function with an external bus. The nonvolatile memory 225 does not lose the stored contents even upon power-off. The image processing unit 227 performs real-time digital image processing. The device controllers 228 and 226 exchange digital image data with the external scanner device 102 and printer device 104, respectively. Note that the CPU 221 directly controls the FAX device 107.

FIG. 2 is a simplified block diagram. For example, the CPU 201, CPU 221, and the like include many CPU peripheral hardware modules such as a chip set, bus bridge, and clock generator. However, the block diagram is simplified for descriptive convenience, and it is to be understood that this block arrangement is not intended to limit the present invention.

The operation of the controller 103 will be explained by exemplifying image copying on a paper medium. When the user designates image copying from the operation unit 105, the CPU 201 sends an original image reading instruction to the scanner device 102 via the CPU 221. The scanner device 102 optically scans a paper original, converts it into digital image data, and inputs the digital image data to the image processing unit 227 via the device controller 228. The image processing unit 227 DMA-transfers the digital image data to the memory 223 via the CPU 221 and temporarily saves it.

If the CPU 201 confirms that the digital image data is saved all or by a predetermined amount in the memory 223, it issues an image output instruction to the printer device 104 via the CPU 221. The CPU 221 instructs the image processing unit 227 about the position (address) of the image data stored in the memory 223. The image data in the memory 223 is transmitted to the printer device 104 via the image processing unit 227 and device controller 226 in accordance with a sync signal from the printer device 104. The printer device 104 prints the digital image data on a paper medium. When printing a plurality of copies, the CPU 201 saves image data of the memory 223 in the hard disk 106. For the second and subsequent copies, the image can be sent to the printer device 104 without receiving the image from the scanner device 102.

<Arrangement of Power Switch>

Figure 3:
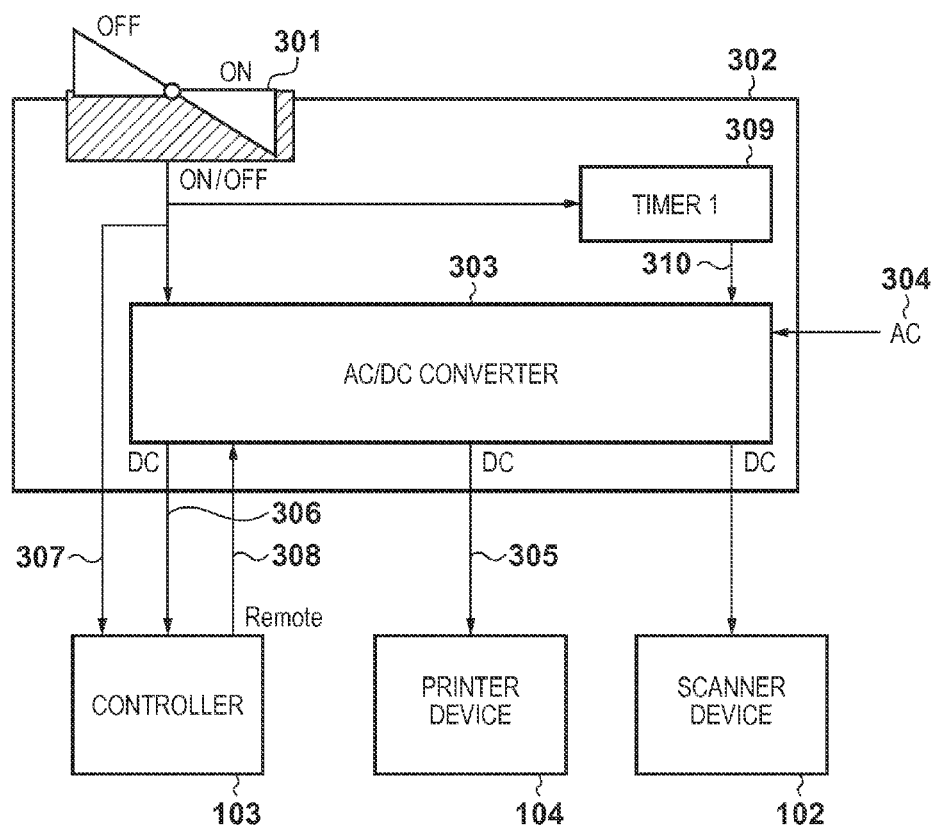
FIG. 3 is a view exemplifying the arrangement of a power supply according to the embodiment.

Next, the arrangement of a power switch in the image processing apparatus 100 according to the embodiment will be explained with reference to FIG. 3. In FIG. 3, reference numeral 301 denotes a toggle power switch; 302, a power supply unit; 303, an AC/DC converter; and 304, an AC power input unit. Reference numeral 305 denotes a power cable for supplying DC power to the printer device 104. Reference numeral 306 denotes a power cable for supplying power to the controller 103. Reference numeral 307 denotes a line which notifies the controller of the state of the toggle switch 301. Reference numeral 308 denotes a power remote signal capable of controlling an output from the AC/DC converter. Reference numeral 309 denotes a power protection timer for reliably guaranteeing the stop of power supply until a predetermined time elapses after the toggle switch 301 is operated to stop power supply. Reference numeral 310 denotes a remote line capable of controlling an output from the AC/DC converter.

The operator can turn on/off the image processing apparatus 100 by operating the toggle switch 301. In the ON state, the toggle switch 301 is connected to the AC/DC converter and can control the energization state of the power supply. In the OFF state, the stop of the power supply 306 is inhibited till the completion of system shutdown (end processing of the image processing apparatus 100) by the controller 103. More specifically, the state of the toggle switch 301 is notified via the line 307, and after completing shutdown, the DC power supply 306 is stopped using the power remote signal 308. In this manner, the power supply arrangement of the image processing apparatus 100 is the same as that of a general device which needs to be shut down.

The toggle switch 301 is a switch which keeps mechanically holding either the ON or OFF state. The operator can input a power supply state by flipping the switch to either the ON or OFF side. The timer 309 measures the time in response to the OFF operation of the toggle switch 301, changes the remote signal 310 after a predetermined time, and can forcibly stop an output from the AC/DC converter 303. That is, this power supply has a function of measuring the time during which the toggle switch 301 is OFF, and stopping the AC/DC converter 303 after a predetermined time to completely turn off the power supply of the apparatus after a predetermined time.

The controller 103 can turn off its power supply using the power remote signal 308. In this case, to prevent a mismatch with the physical OFF/ON state of the toggle switch 301, when the controller 103 is notified of the power-off via the line 307, it can automatically turn off the toggle switch 301 with a solenoid using an electromagnet or the like.

More specifically, supply of power from the power supply shown in FIG. 3 to the "controller 103, printer device 104, and scanner device 102" is stopped by two methods: (1) the controller 103 receives the OFF operation of the switch 301 via the line 307, and turns off the power supply of the "controller 103, printer device 104, and scanner device 102" using the power remote signal 308 after shutdown; and (2) the timer 309 measures the OFF state of the switch for a predetermined time (120 s), and if no OFF operation occurs in the power remote signal 308 till the lapse of the predetermined time (120 s), the remote control signal 310 changes to turn off the power supply of the "controller 103, printer device 104, and scanner device 102". Method (2) provides a power protection circuit for preventing a state in which the power supply of the "controller 103, printer device 104, and scanner device 102" is not turned off though the toggle switch 301 is turned off.

<Processing Sequence Upon Shutdown>

A processing sequence when the toggle switch 301 is turned off will be explained with reference to FIG. 4. An operation when the operator ends the main body will be described. Upon detecting that the toggle switch 301 serving as a main body power switch has been turned off, the CPU 201 executes the following processing. At this time, the power protection timer 309 starts time measurement for the power protection circuit. The following processing is implemented by reading out, to the memory 203, a control program stored in the nonvolatile memory 205, HDD 106, or the like and executing it by the CPU 201.

In step S401, when the toggle switch 301 is turned off, the CPU 201 displays on the operation unit 105 a screen representing that the system is being ended. In step S402, the CPU 201 performs interrupt/end processing for a running service and the like. Since the end processing is executed parallelly by a plurality of processes, the CPU 201 determines in step S403 whether the end processing has been completed. If the end processing has been completed, the process advances to step S404; if it has not been completed, the CPU 201 periodically repeats the determination in step S403.

In step S404, the CPU 201 synchronizes (SYNC) a memory value with the storage. "Synchronize (SYNC)" means processing of storing, in the storage, for example, the contents of a storage buffer cached in a DRAM in order to synchronize the contents of the buffer with the storage. In step S405, the CPU 201 calls the shutdown I/F of the kernel and performs software final end processing of the kernel. Afterwards, in step S406, the CPU 201 turns off the AC/DC converter 303 using the power remote signal 308, thereby turning off the power supply of the overall apparatus. Since the power supply of the overall apparatus is turned off, the power supply of the timer 309 itself is also turned off, and the power protection timer stops its function.

Figure 4:
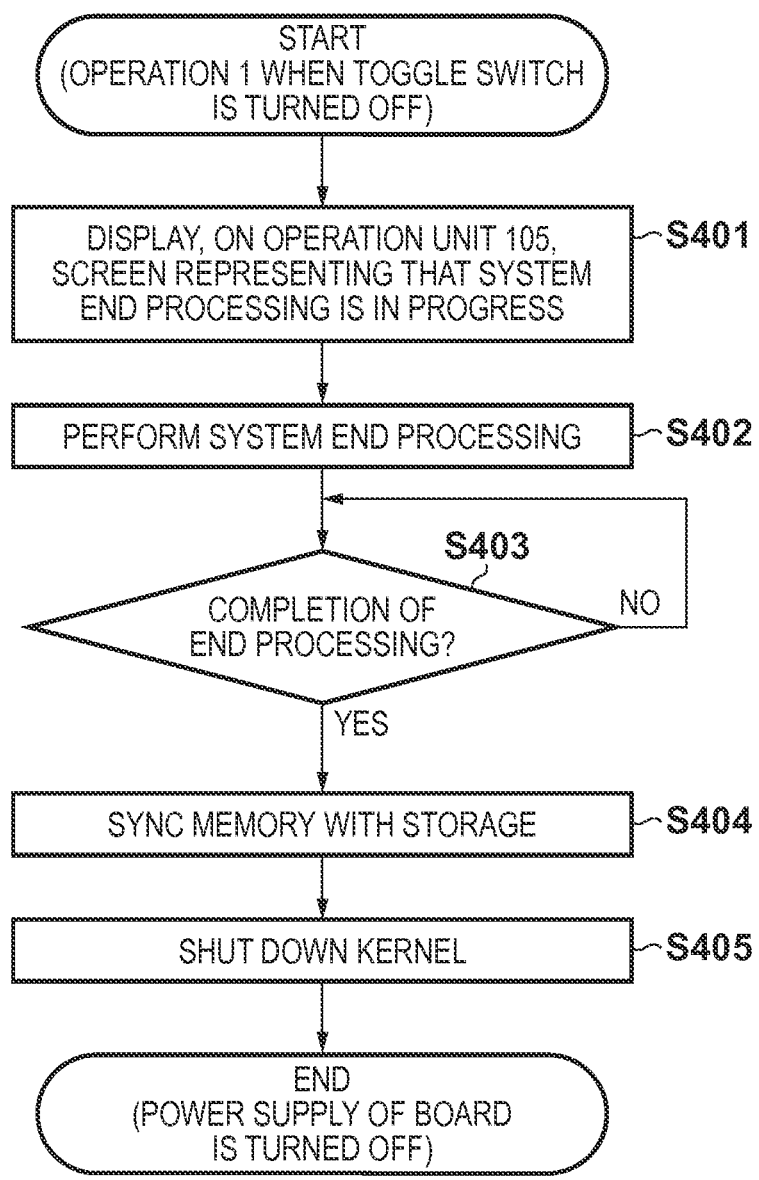
FIG. 4 is a flowchart showing a processing sequence in shutdown according to the embodiment.

If any processing in the flowchart shown in FIG. 4 stops due to any trouble, the controller 103 does not change the power remote signal 308. In this case, however, the timer 309 stops an output from the AC/DC converter 303 using the remote control signal 310, thereby forcibly turning off the power supply.

<Hibernation>

Figure 5:
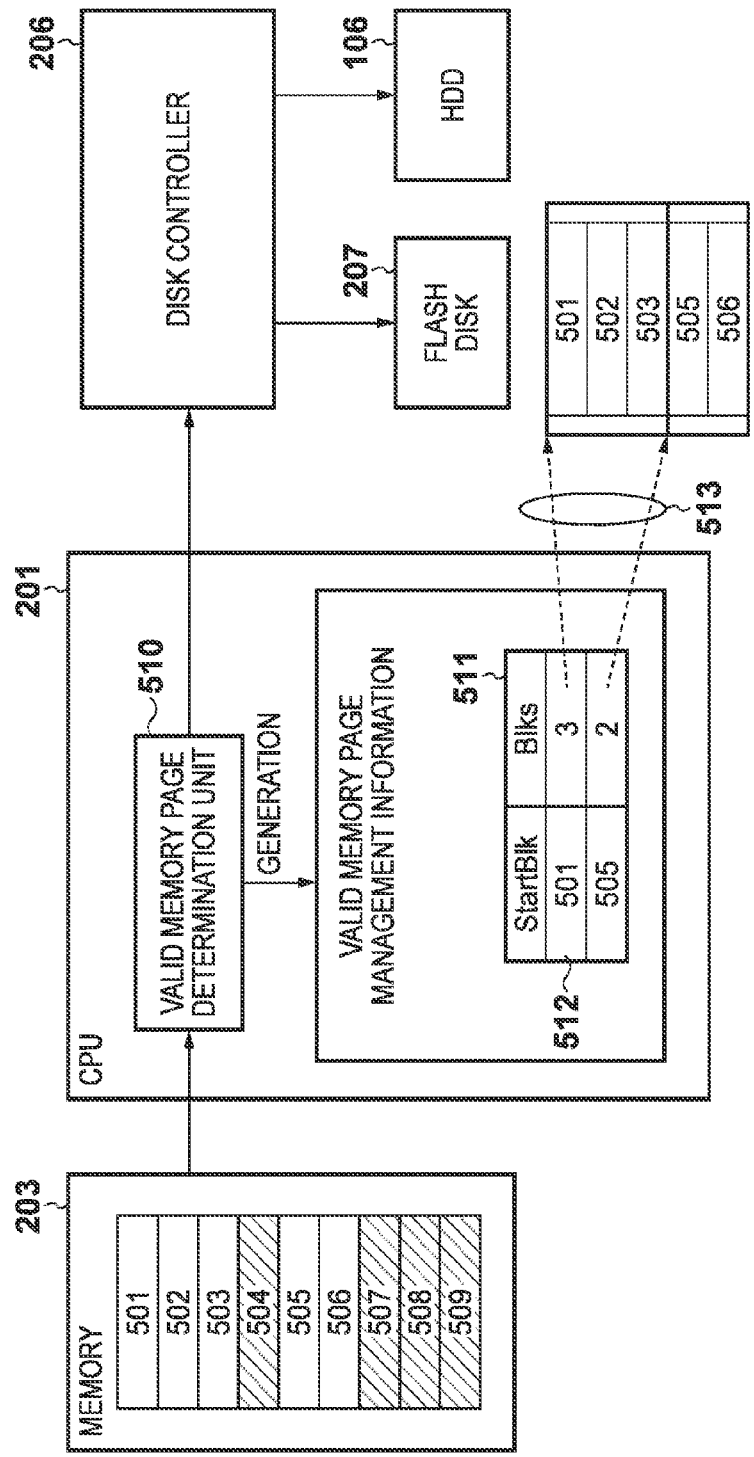
FIG. 5 is a view for explaining hibernation according to the embodiment.

A hibernation method used in the embodiment will be explained with reference to FIG. 5. Hibernation is a function of saving a state immediately before the power supply of the apparatus is turned off, and when the power supply is turned on the next time, restarting the operation from the state immediately before the power supply is turned off. To use hibernation at the time of power-off, the state (contents) of a predetermined memory at the time of power-off needs to be held. A general kernel running on the CPU 201 manages the memory 203 by "page" for every predetermined size. The page takes two states:

A. memory in a discard-permitted state (invalid memory)
B. memory in a discard-inhibited state (valid memory)

A represents a page for which it is known that its contents are synchronized with an external disk while the memory operates as a disk cache, or an unused memory. B represents a state in which a change request from the user to an external disk is cached in the memory, but the contents have not been synchronized yet, or the memory of the kernel itself. Since memory A can be discarded, it suffices to save only memory B as a hibernation target. Some kernels allow deleting even a valid memory in which 0s are stored in the entire area. A valid memory page determination unit 510 functions as a selection means, and determines a valid memory. However, the determination condition changes depending on the type and system of kernel.

In the embodiment, 501 to 503, 505, and 506 out of memories 501 to 509 serve as valid memories B. By saving only valid memoires in the disk using the hibernation method and returning them, the image processing apparatus 100 can return to a previous state. Hibernation is executed in two ways, that is, almost performed by a BIOS, or controlled by software. The former method needs to save and return all memory areas because there is no means for restricting valid memories. Thus, the latter method is becoming a recent mainstream. Since the latter method runs within the kernel, hibernation processing can end within a short time by saving and returning only a necessary portion of the memory. Recently, the latter soft hibernation method (to be referred to as soft hibernation hereinafter in the embodiment) is frequently adopted. Although the embodiment will be explained based on the soft hibernation method, the present invention does not limit the hibernation method.

<Hibernation Shift Processing>

Shift processing when hibernation ends will be explained with reference to FIG. 6. The shift processing will be explained using the example shown in FIG. 5. The following processing is implemented by reading out, to the memory 203, a control program stored in the nonvolatile memory 205, HDD 106, or the like and executing it by the CPU 201.

After the start of hibernation shift processing, the CPU 201 outputs a message "during system end processing" on the operation unit 105 in step S601. In step S602, the CPU 201 interrupts the driver of a currently operating hardware device to stop its operation in order to turn off the power supply of the board.

In step S603, the CPU 201 sequentially reads 501 to 509 of the memory 203, and the valid memory page determination unit 510 determines only a necessary memory. In FIG. 5, valid memories are 501 to 503, 505, and 506. In step S604, the CPU 201 generates valid memory page management information. In the embodiment, the valid memory page management information includes information about the start block in which a valid memory starts, and information about the number of blocks by which valid memory blocks continue, as represented by 511. In addition to these two pieces of information, the management information may contain information, as needed, such as the address of a physical memory, an address in a virtual memory, the application purpose of the memory, and a save position in the storage. The valid memory page management information in the embodiment means management information for referring to a memory block retracted to the storage in order to restore it in the main memory.

In step S605, the CPU 201 saves memories of three blocks starting from 501 in the flash disk 207 via the disk controller 206 in accordance with, for example, information represented by 512 serving as one element of the valid memory page management information. In step S606, the CPU 201 loops the processing until all memory blocks which are listed in the valid memory page management information and need to be retracted are saved. Data transfer as represented by 513 is generated from the memory 203 in accordance with 511.

After completing the processing of retracting all valid memories to the flash disk 207, the CPU 201 saves the valid memory page management information 511 itself in step S607, and synchronizes all memory values with the storage (flash disk 207) in step S608. After that, the CPU 201 turns off the power supply of the system using the power remote signal 308.

<Secondary Storage Device>

Figure 7:
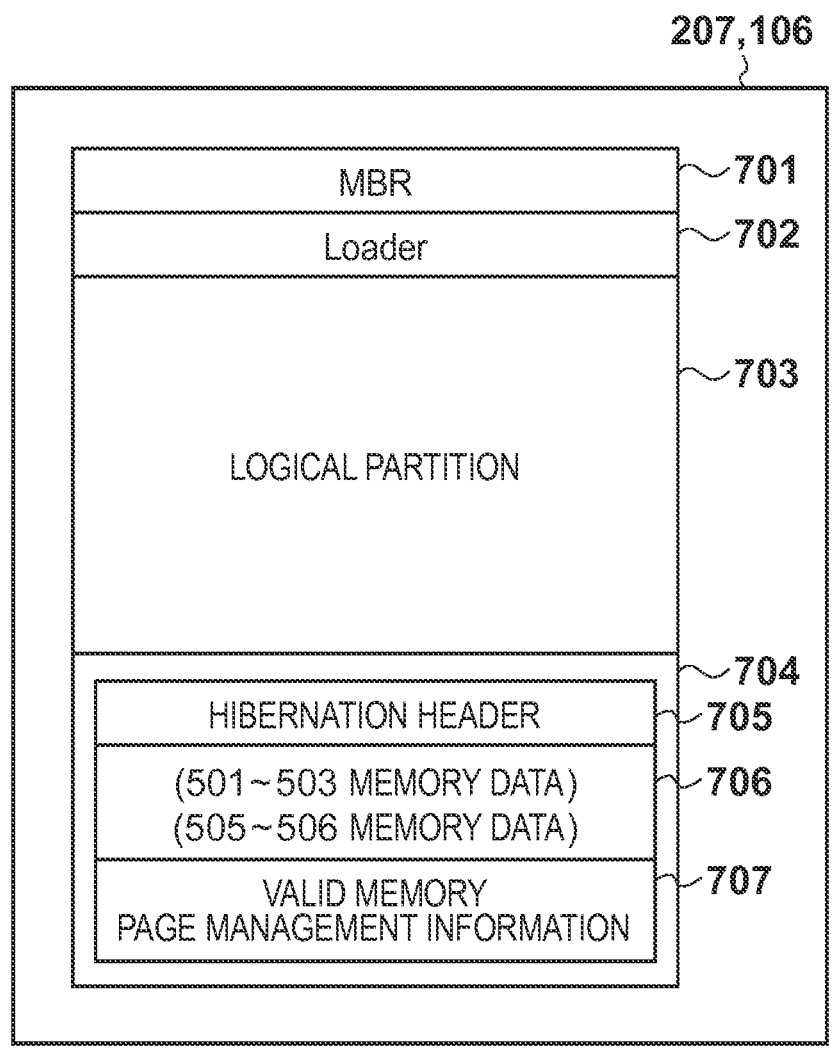
FIG. 7 is a view showing a secondary storage device according to the embodiment.

A memory map on the flash disk 207 serving as a secondary storage device will be explained with reference to FIG. 7. Reference numeral 701 denotes an MBR (Master Boot Record); 702, a system loader; and 703, logical partitions. An area 704 is defined for hibernation, and includes a hibernation header 705, a data area 706, and valid memory page management information 707. The data area 706 stores pieces of information contained in the memories 501 to 503, 505, and 506. Note that this memory map is merely an example, and is not intended to limit the present invention.

<Timing Chart>

Figure 8:
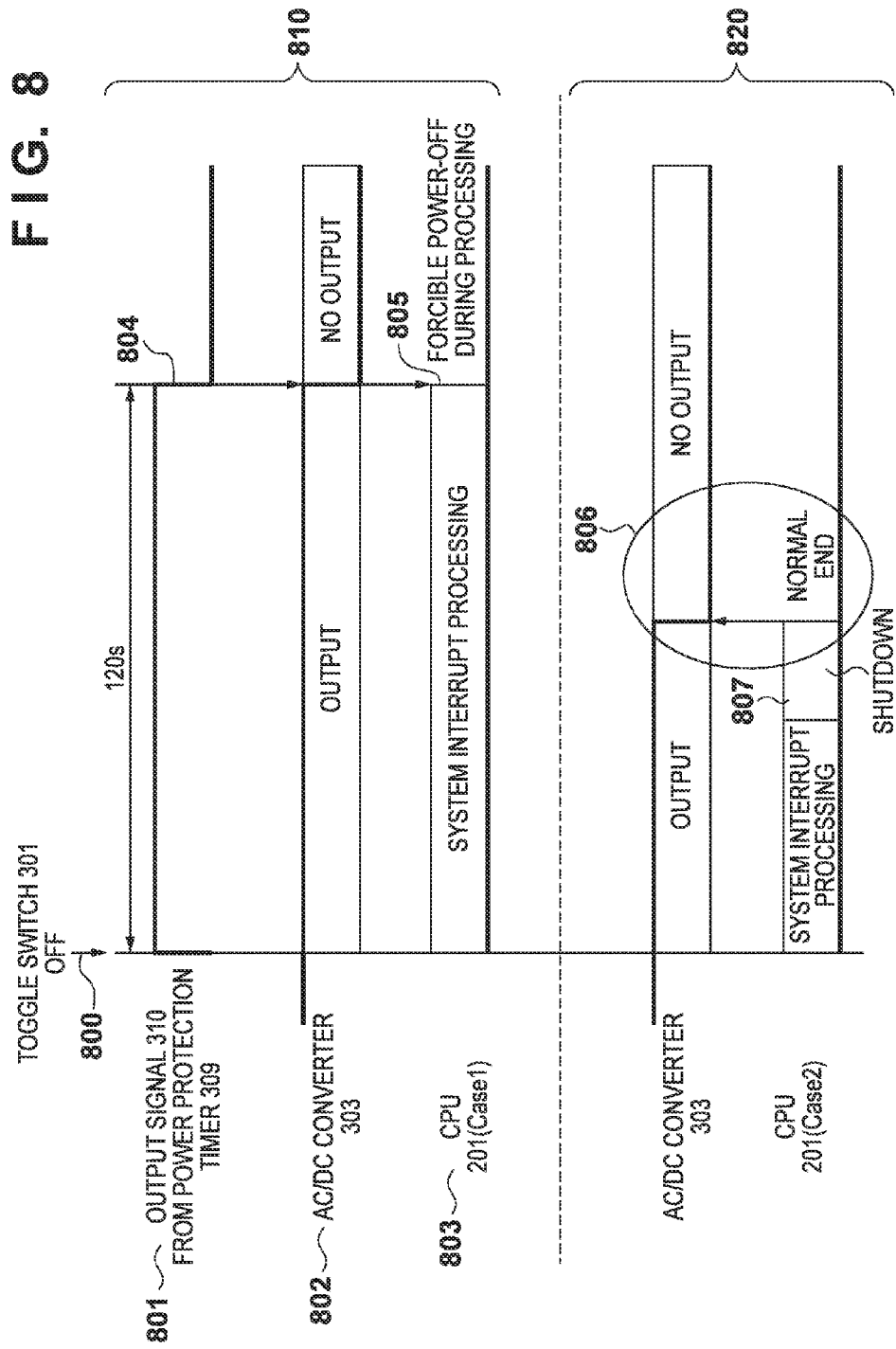
FIG. 8 is a timing chart showing a normal case and a case in which a trouble occurs.

A case 820 in which hibernation shift processing is normally performed, and a case 810 in which forcible power-off of the CPU 201 occurs will be explained with reference to FIG. 8. First, the case 810 will be described. Reference numeral 801 denotes a count-up state of the power protection timer 309 in FIG. 3. Reference numeral 802 denotes a voltage output from the AC/DC converter 303. Reference numeral 803 denotes a content of processing executed by the CPU 201 in FIG. 2. The abscissa represents the time. The operation states 801 to 803 are described from a timing 800 when the toggle switch 301 is turned off.

When the operator turns off the toggle switch 301 at the timing 800, the power protection timer 309 starts counting up in order to protect the power supply. In the embodiment, the measurement time of the power protection timer 309 is set to 120 sec. That is, the embodiment guarantees power-off after 120 sec.

As represented by 803, the CPU 201 executes system interrupt processing (hibernation shift processing) described with reference to FIG. 6. The power protection timer 309 measures 120 sec to protect the power supply. If system interrupt processing by the CPU 201 (Case 1) requires 120 sec or longer, as represented by 803, the remote control signal 310 is disabled at a timing 804, and power supply to the AC/DC converter 303 in 802 stops. In response to this, the power supply of the controller 103 is turned off, and the power supply is forcibly turned off though the CPU 201 executes hibernation processing. Hibernation stops while the storage is accessed to write a memory value in the storage, so data in the storage may be damaged.

Next, the case 820 will be explained. When system interrupt processing by the CPU 201 (Case 2) ends within 120 sec, shutdown 807 is executed, the power supply of the AC/DC converter 303 can be spontaneously turned off after completing hibernation processing, and the system normally ends, as represented by 806.

A plurality of varying factors exist for the time taken for hibernation shift processing, and the range of variation is large. Examples of the factors are
- a great increase in the amount of data subjected to hibernation as the memory 203 gets dirty
- a temporary decrease in storage access speed in write in the data area 706. When a delay arises from an external device, the time required is not known before actually accessing the external device, and cannot be calculated in advance.

<Processing Sequence>

Figure 9:
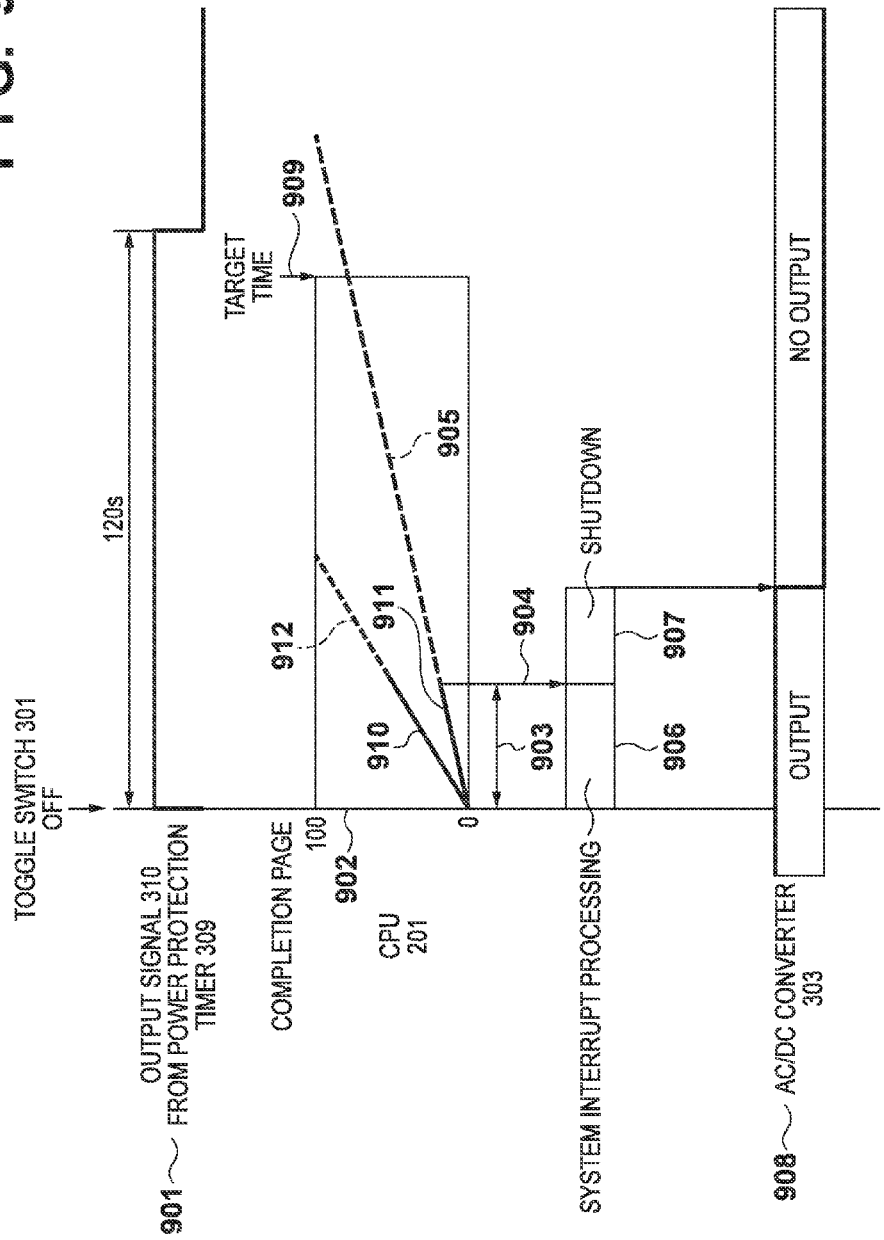
FIG. 9 is a timing chart according to the embodiment.
Figure 10:
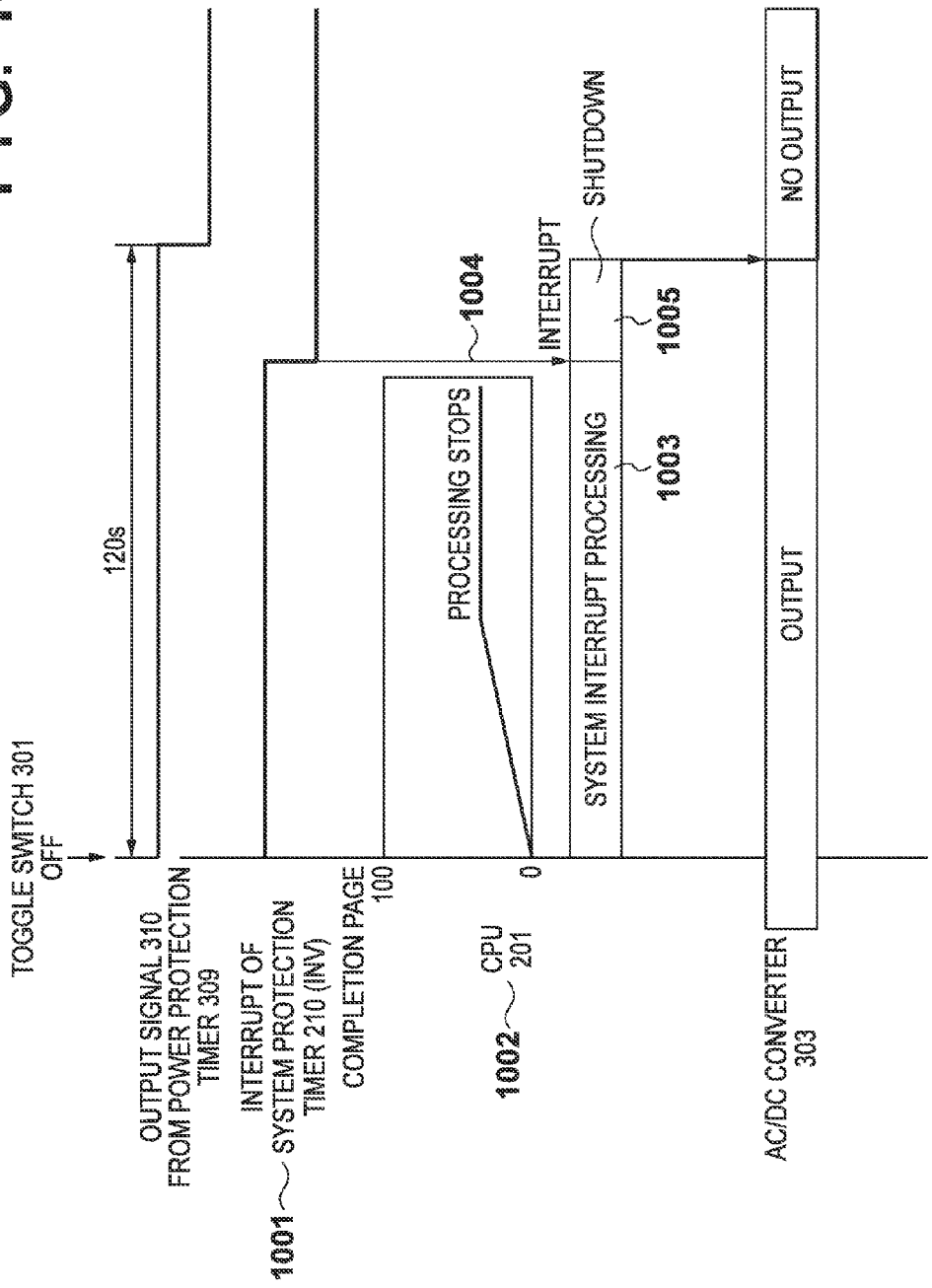
FIG. 10 is a timing chart showing a system protection timer according to the embodiment.
Figure 11:
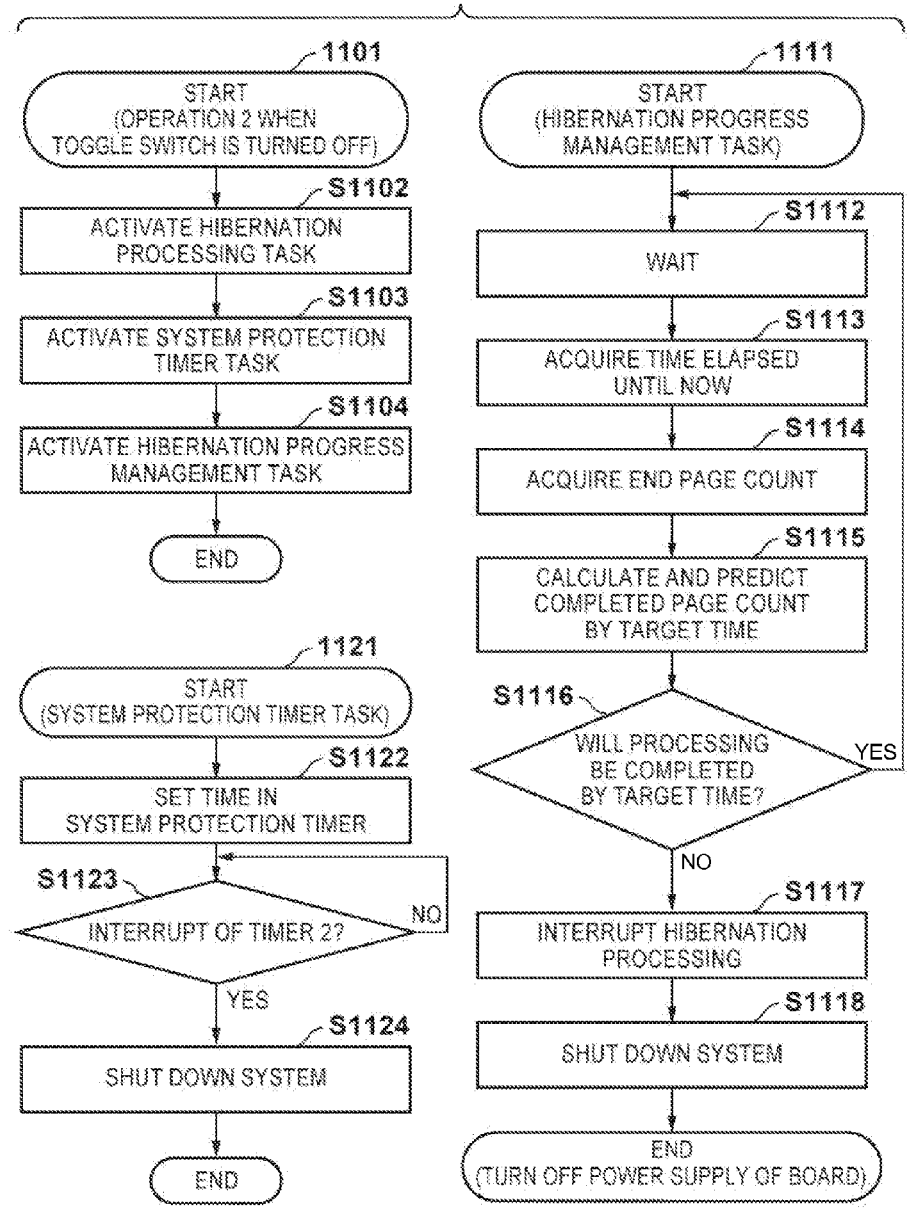
FIG. 11 is a flowchart showing a processing sequence according to the embodiment.

The present invention proposes a hibernation shift processing method in a situation in which the apparatus needs to end within a predetermined time, as described above. A processing sequence and timing when the toggle switch 301 in the present invention is turned off will be explained with reference to FIGS. 9 to 11. FIG. 9 is a timing chart when hibernation shift processing in the embodiment is executed. FIG. 11 shows the processing sequence of hibernation shift processing in the embodiment. The following processing is implemented by reading out, to the memory 203, a control program stored in the nonvolatile memory 205, HDD 106, or the like and executing it by the CPU 201.

In FIG. 9, reference numeral 901 denotes a count-up state of the power protection timer 309. The ordinate of a graph 902 normalizes, to 100, the progress of all pages which need to be written in the data area 706 while the CPU 201 executes the processes in steps S606 and S607. That is, the ordinate forms a graph representing the progress of save processing of data to be written in the data area 706.

When the operator turns off the toggle switch 301, a flow-chart 1101 in FIG. 11 is executed according to the embodiment. The CPU 201 activates a hibernation shift processing task (task which executes the flowchart of FIG. 6) in step S1102, and activates a system protection timer task (task which executes a flowchart 1121 in FIG. 11) in step S1103. Further, the CPU 201 activates a hibernation progress management task (task which executes a flowchart 1111 in FIG. 11) in step S1104, and ends the processing. These three flowcharts are executed virtually parallelly on the CPU 201 by independent threads.

As described above, in the flowchart of FIG. 6, all memory pages subjected to hibernation are calculated and sequentially written in the data area 706. After completing the write, hibernation shift processing is executed to perform shutdown. The flowchart 1111 is executed by a task which operates parallelly even during execution of the hibernation processing and manages the progress of hibernation. More specifically, it is monitored whether the flowchart in FIG. 6 will be completed by target time 909.

Figure 6:
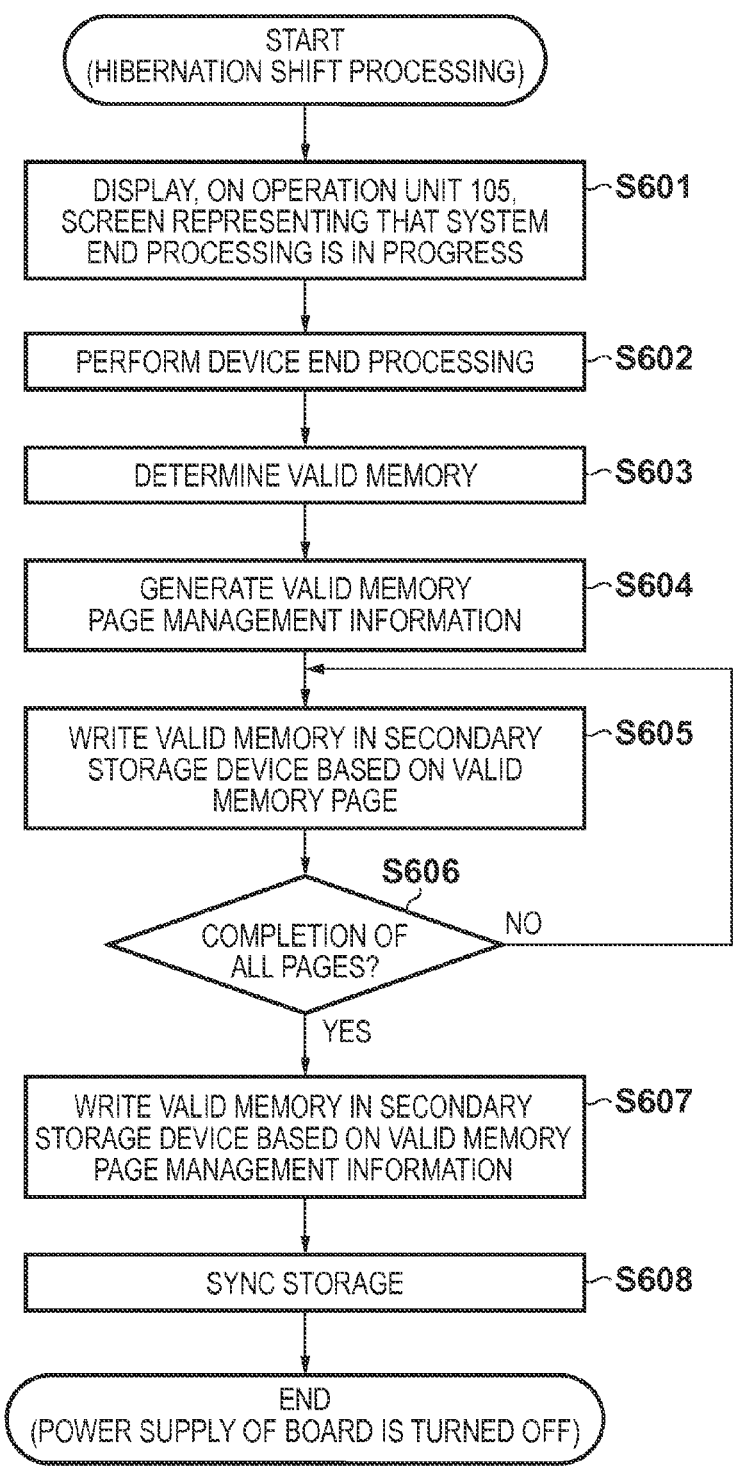
FIG. 6 is a flowchart showing a processing sequence in system interruption according to the embodiment.

First, a normal end case in which hibernation save processing (hibernation processing) executed in the flowchart of FIG. 6 is performed as indicated by a solid line 910 in FIG. 9 will be explained with reference to the flowchart 1111. In step S1112, the CPU 201 waits for a predetermined time 903. In step S1113, the CPU 201 acquires the time t (point on the abscissa of the graph 902) elapsed until now. In step S1114, the CPU 201 acquires a total page count in the memory page and a currently ended page count.

In step S1115, the CPU 201 determines whether memory page save processing in the current hibernation will be completed by the target time 909. Although there are various calculation methods, the progress can be calculated using, for example, the following equation:

$$\text{progress} = (\text{number of written memory pages})/(\text{number of memory pages which need to be written}) * 100 \quad (1)$$

According to equation (1), the progress [%] at the current time t along the ordinate of the graph 902, that is, when the completion of write processing is defined as 100% can be obtained.

In step S1116, whether memory page save processing will be completed by the target time 909 on the current progress is determined using the following conditional expression:

$$(\text{progress} * \text{target time 909})/t > 100 \quad (2)$$

By evaluation expression (2), it can be determined whether hibernation save processing will be completed by the target time 909.

For the solid line 910, it can be predicted that save processing will progress as indicated by a broken line 912. It is therefore determined that save processing for all pages will be completed by the target time 909. The process returns to wait processing in step S1112. After the wait in step S1112, the same evaluation is performed again. The loop processing is repeated several times, and if no problem occurs, the save processing progresses as indicated by the broken line 912. The storage is synchronized in the processing of step S608, the AC/DC converter 303 is turned off, and the power supply of the board is turned off. This is the processing sequence in the normal case.

Next, a hibernation interrupt/end case in which hibernation save processing in the flowchart of FIG. 6 is performed as indicated by a solid line 911 will be described. Similar to the case as indicated by the solid line 910, steps S1112 to S1116 are executed. After calculation in step S1116 is performed, it can be predicted that the processing will not be completed by the target time 909 on the current progress. Thus, the process advances to step S1117, and the CPU 201 interrupts the hibernation processing in the flowchart of FIG. 6, and processes information in the hibernation areas 705 to 707 (for example, discards intermediate data). Subsequently, in step S1118, the CPU 201 functions as a power control means, shuts down the system, and turns off the power supply. This is a shutdown operation 907 in FIG. 9. The power supply of the board is turned off after completing shutdown, as represented by 908.

In this way, when hibernation save processing is not completed within a predetermined time, the present invention can be practiced to end the system within a short time without waiting till the target time 909. By properly setting the target time 909, a risk that the power supply is turned off during the hibernation operation can be avoided even for a power supply source externally equipped within a timer device configured to forcibly turn off the power supply.

This method becomes valid when processing by the CPU 201 which performs hibernation processing operates normally. In some cases, the flowchart 1111 may not operate normally, or a process which is executing hibernation may freeze and not operate at a timing 1003 shown in FIG. 10. In such a case, the processes in steps S1116 to S1118 are neither determined nor executed, and the power supply is forcibly turned off. To prevent this, the embodiment provides a mechanism for normally ending hibernation by a system protection timer task even in these abnormal states. Detailed processing will be explained with reference to the timing chart of FIG. 10 and the flowchart 1121 of FIG. 11.

First, in step S1122, the CPU 201 sets the system protection timer 210. The time is set to satisfy time of timer 210 < (time of timer 309 − time of shutdown 1005)

time of timer 210 > (target time 909 + time of shutdown 1005) (3)

More specifically, the time (second time) set in the timer 210 is set to be shorter than the time obtained by subtracting the time necessary for shutdown processing from the time (first time) set in the timer 309, and longer than the time obtained by adding the time necessary for shutdown processing to the target time 909. With these settings, even when an event is issued to the CPU 201 before the lapse of the time of the timer 309 and the shutdown processing 1005 is performed upon receiving the event, it can be controlled to complete hibernation processing by the time of the power protection timer 309. In step S1122, the set time of the timer 210 that is obtained from the conditions of expressions (3) is set.

In step S1123, the CPU 201 determines whether an interrupt of the timer 210 has occurred. If no interrupt has occurred, the determination in step S1123 is periodically repeated. If an interrupt has occurred, the process advances to step S1124. If the timer 210 expires at a timing 1004 in FIG. 10, the process advances to step S1124. The CPU 201 functions as a forcible end means, performs the shutdown processing 1005, and then turns off the power supply of the board before the time of the power protection timer 309 expires. This control is built in a process different from a process (software resource) which executes hibernation, or a system which operates in a privileged mode such as a kernel mode. Accordingly, normal end processing of the system can be executed further forcibly.

According to the embodiment, when no hibernation is performed, a cold boot of the system is performed in the next power-on operation. Therefore, the apparatus cannot return to a state immediately before the previous end, and the startup time becomes long. However, the apparatus can be controlled normally.

As described above, according to the embodiment, data save processing of hibernation having a large time variation factor can be safely performed in an image processing apparatus including a time-limit timer which forcibly stops power supply from the outside in response to the OFF operation of the toggle switch 301 as a trigger. If data save processing will not be completed in time, it can be abandoned in a minimum time. This can shorten the time (system end time) until the power supply is actually turned off upon switch-off.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-270616 filed on Dec. 9, 2011, which is hereby incorporated by reference herein in its entirety.

What is claimed is:

1. An image processing apparatus, comprising:
a power switch;
a power stopping unit that forcibly stops power supply to the image processing apparatus when a first time has elapsed after the power switch is operated;
a processing unit that executes hibernation processing to retract, in a second storage unit, a stored content of a first storage unit used as a work area by a CPU of the image processing apparatus in a case where the power switch is operated;
a determination unit that determines, after starting the hibernation processing, whether or not the hibernation processing by said processing unit will be completed before the first time elapses; and
a control unit that, in a case where the determination unit has determined that the hibernation processing is not completed before the first time elapses, interrupts the hibernation processing being executed by said processing unit, and executes a shutdown processing of the image processing apparatus.

2. The apparatus according to claim 1, wherein said processing unit comprises
a selection unit that selects, from a plurality of memory blocks of the first storage unit, a memory block whose stored content is to be retracted to the second storage unit,
a generation unit that generates management information representing information of the memory block selected by said selection unit, and
a retraction unit that stores, in the second storage unit, the stored content of the memory block selected by said selection unit, and the management information generated by said generation unit.

3. The apparatus according to claim 2, wherein said determination unit determines, by referring to the management information generated by said generation unit, whether or not the hibernation processing by said processing unit will be completed within the target time.

4. The apparatus according to claim 1, further comprising:
a timer unit that times a time elapsed after operating the power switch, and
wherein the control unit, when said timer unit times a second time shorter than the first time, executes the shutdown processing of the image processing apparatus.

5. The apparatus according to claim 1, further comprising an activation unit that executes a cold boot in a case where the image processing apparatus which the shutdown processing is executed is activated.

6. The apparatus according to claim 1, wherein the determination unit determines whether or not the hibernation processing by said processing unit will be completed before the first time elapses, based on a time period elapsed after starting the hibernation processing and a progress of the hibernation processing executed in the elapsed time period.

7. A method for controlling an image processing apparatus comprising a power switch, comprising:
forcibly stopping power supply to the image processing apparatus when a first time has elapsed after the power switch is operated;
executing hibernation processing to retract, in a second storage unit, a stored content of a first storage unit used as a work area by a CPU of the image processing apparatus in a case where the power switch is operated;
determining, after starting the hibernation processing, whether or not the hibernation processing will be completed before the first time elapses; and
interrupting, in a case where it has been determined that the hibernation processing is not completed before the first time elapses, the hibernation processing being executed, and executing the shutdown processing of the image processing apparatus.

8. A non-transitory computer-readable storage medium storing a computer program for causing a computer to execute each step in an image processing apparatus control method defined in claim 7.

* * * * *